No. 800,167. PATENTED SEPT. 26, 1905.
R. L. MORGAN.
MOTOR TRUCK AND MEANS FOR LOADING AND UNLOADING SAME.
APPLICATION FILED MAR. 3, 1902. RENEWED APR. 14, 1905.
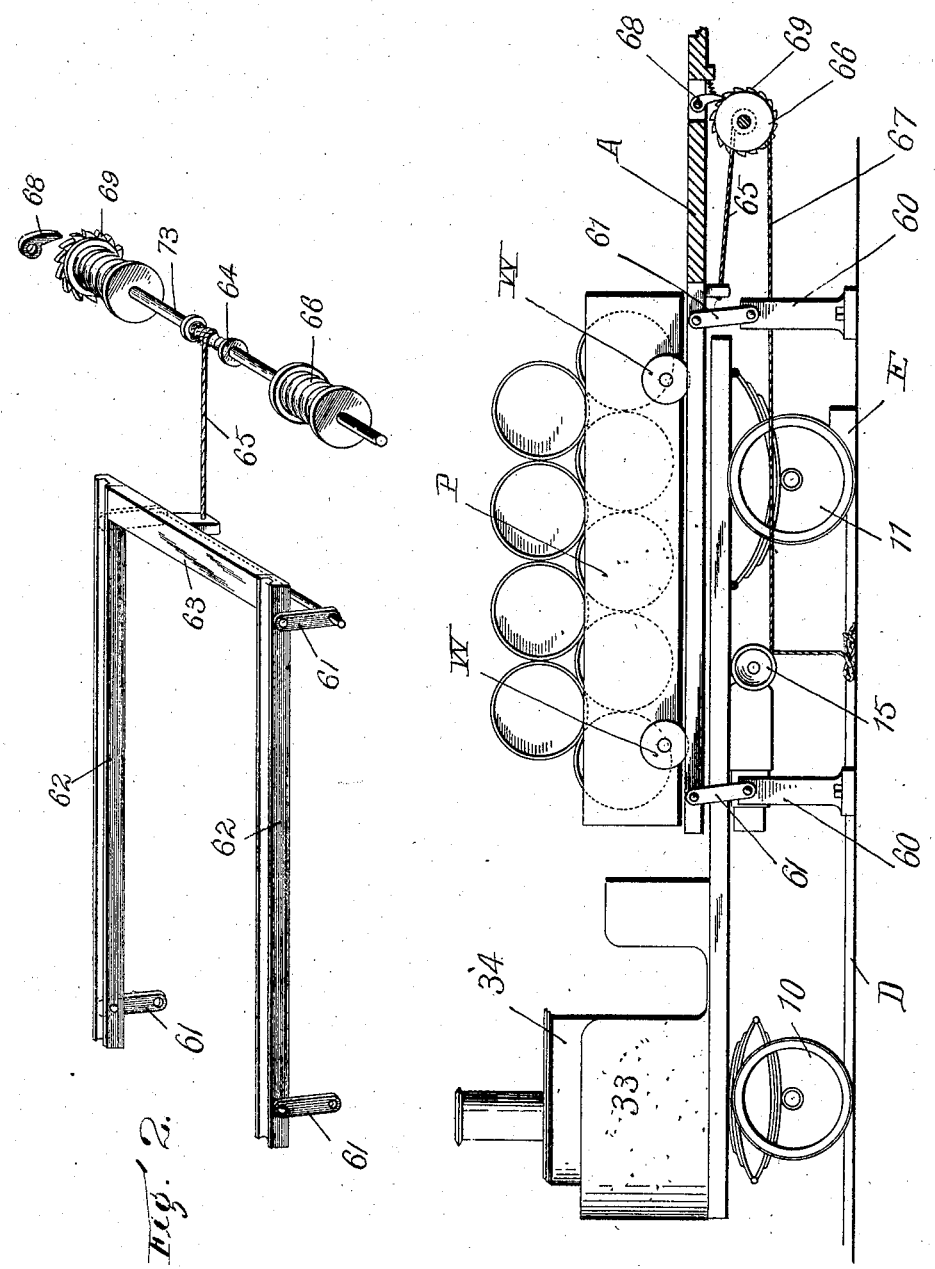

UNITED STATES PATENT OFFICE.

RALPH L. MORGAN, OF WORCESTER, MASSACHUSETTS.

MOTOR-TRUCK AND MEANS FOR LOADING AND UNLOADING SAME.

No. 800,167.      Specification of Letters Patent.      Patented Sept. 26, 1905.

Application filed March 3, 1902. Renewed April 14, 1905. Serial No. 255,653.

*To all whom it may concern:*

Be it known that I, RALPH L. MORGAN, a citizen of the United States, residing at Worcester, in the county of Worcester and State of Massachusetts, have invented a new and useful Motor-Truck and Means for Loading and Unloading Same, of which the following is a specification.

This invention relates to that class of power-driven trucks which are employed for ordinary trucking or freight-handling purposes.

The especial object of this invention is to provide an apparatus for loading or unloading a motor-truck, the construction being especially adapted to be operated by power furnished by the truck itself.

To this end this invention consists of the apparatus for loading and unloading motor-trucks and of the combinations of parts therein, as hereinafter described, and more particularly pointed out in the claims at the end of this specification.

In the accompanying drawings, Figure 1 is a side view, partially broken away, of a motor-truck and the apparatus for loading and unloading the same constructed according to my invention; and Fig. 2 is a detail perspective view of the lifting-frame and the connections for operating the same.

In handling nearly all classes of freight the loading and unloading of trucks has heretofore ordinarily been done by hand. This practice is especially objectionable for the loading and unloading of motor-trucks on account of the time during which the truck is required to remain stationary, the large cost of motor-trucks and the expense of skilled engineering help for running the same requiring that for economical operation the truck should be kept running as much of the time as possible.

The especial object of my present invention is therefore to provide an apparatus for loading or unloading a motor-truck which may be operated without the waste of time heretofore required for loading or unloading a truck by hand. To accomplish this result, a loading apparatus constructed according to this invention comprises a lifting-frame arranged to support a crate or body portion in such position that a truck can be run into place beneath the same, so that by then lowering the lifting-frame the crate will be deposited upon the truck. The lifting-frame may be operated by hand or by any suitable source of power, although in practice I prefer to arrange the same to be operated from power furnished by the truck itself.

To unload a truck according to my invention, an inverse order of operation is followed—that is to say, the truck carrying a crate or body portion is first run into place, and the load is picked up from the truck by raising the lifting-frame.

Referring to the accompanying drawings and in detail for a description of an apparatus for loading and unloading trucks according to my invention, A designates a platform, and leading from the platform A are tracks D, provided with a stop or bumper E so located as to stop a truck accurately in position when the same is backed in toward the platform A on the tracks D.

The motor-truck herein illustrated may comprise a platform mounted to run on front wheels 10 and rear wheels 11. Near the front of the platform of the truck is an engineer's cage 33 with a boiler 34.

The engine supplied from the boiler 33 and the operative parts of the truck are preferably located below the truck-platform, and at its sides the truck may be provided with capstan-heads 15.

In this application for patent I do not claim any particular form of motor-truck, nor any particular construction for operating the capstan-heads 15, as such features are claimed in an application for patent filed by me January 18, 1902, Serial No. 90,258.

The loading devices constructed according to my invention consist, essentially, of fixtures connected with the platform A. As herein illustrated, I arrange posts or supports 60 at the sides of the tracks D, and supported by links 61 from the posts 60 is a lifting-frame for picking up or depositing the load onto the platform of the truck. The lifting-frame, as illustrated most clearly in Fig. 2, may consist of grooved tracks or side pieces 62, connected at their inner ends by a cross-piece 63.

The connections for operating the lifting-frame, as herein illustrated, comprise an operating-shaft 73, journaled in fixed bearings and having a windlass or pulley 64, connected by a rope or cable 65 to the lifting-frame. At its ends the shaft 73 is provided with pulleys or windlasses 66, from which a rope or cable 67 may be carried to one of the capstan-heads 15 of the truck. At one end the shaft 73 is provided with a ratchet-wheel 69, and coöperating with the ratchet-wheel 69 is a holding-pawl 68. By means of this construction a loaded crate or body portion P, which is preferably mounted on wheels W, may first be pushed out into place on the lifting-frame, so that by then releasing the pawl 68 and slacking off the cable or rope 67 the crate or body portion may be deposited upon the platform of the truck, while to unload the truck the operations are performed in inverse order, the truck being first backed into place and its crate or body portion being picked up by raising the lifting-frame from the capstan-head 15 of the truck.

I am aware that numerous changes may be made in practicing my invention by those who are skilled in the art. I do not wish, therefore, to be limited to the construction I have herein shown and described; but What I do claim, and desire to secure by Letters Patent of the United States, is—

1. In an apparatus of the class described, the combination of a motor-truck, a crate or body therefor, a lifting-frame for supporting the crate or body so that the truck may be run into place beneath the same, with connections for the lifting-frame operated by power from the motor-truck.

2. In an apparatus of the class described, the combination of a motor-truck, a crate or body therefor, a platform, a lifting-frame extending out from said platform to support the crate or body so that the truck may be run into place beneath the same, means for lowering the frame to deposit the crate or body upon the truck, and connections operated by power from the truck to pick up the crate or body to unload the truck.

3. In an apparatus of the class described, the combination of a motor-truck, a crate or body therefor, a lifting-frame for supporting the crate or body, so that the truck may be run into place beneath the same, and a connection from the motor which furnishes motive power for the truck for operating the lifting-frame to pick up the crate or body to unload the truck.

4. In an apparatus of the class described, the combination of a motor-truck having a motor or engine with a capstan turned thereby, a crate or body for the motor-truck, a lifting-frame, and ropes or cables forming a connection for operating the lifting-frame from the capstan to pick up the crate or body to unload the truck.

5. In an apparatus for loading or unloading trucks, the combination of a platform, a lifting-frame, supporting-links connected substantially to each corner of the lifting-frame in position so that when the lifting-frame is raised, it may support a crate or body in position so that a truck may be run into place beneath the same, an operating-shaft having a rope or cord connected to the lifting-frame, drums secured on the ends of the operating-shaft in position so that cords or cables therefrom can be carried to the capstan-heads of the truck, and a ratchet-and-pawl mechanism for holding the lifting-frame in its raised position.

In testimony whereof I have hereunto set my hand in the presence of two subscribing witnesses.

RALPH L. MORGAN.

Witnesses:
WM. V. LOWE,
A. W. DOE.